United States Patent [19]

Schmittle

[11] Patent Number: 5,509,623
[45] Date of Patent: Apr. 23, 1996

[54] FREE WING AIRCRAFT HAVING A FREE WING USED AS AN AIR BRAKE TO SHORTEN ROLL-OUT FOLLOWING TOUCHDOWN

[75] Inventor: Hugh Schmittle, Westminster, Md.

[73] Assignee: Freewing Aerial Robotics Corporation, College Park, Md.

[21] Appl. No.: 261,902

[22] Filed: Jun. 15, 1994

[51] Int. Cl.⁶ ........................................ B64C 3/38
[52] U.S. Cl. ............................... 244/48; 244/113
[58] Field of Search ........................ 244/13, 38, 213, 244/46, 48, 113, 7 C, 56

[56] References Cited

U.S. PATENT DOCUMENTS

| | | | |
|---|---|---|---|
| 1,772,586 | 8/1930 | Wilford | 244/113 |
| 1,821,764 | 9/1931 | Murray | 244/113 |
| 2,205,714 | 6/1940 | Doepp | 244/113 |
| 3,415,469 | 12/1968 | Spratt | 244/48 |
| 4,928,907 | 5/1990 | Zuck | 244/48 |

FOREIGN PATENT DOCUMENTS 818381  9/1937  France .................. 244/113

*Primary Examiner*—Galen L. Barefoot
*Attorney, Agent, or Firm*—Lowe, Price, LeBlanc & Becker

[57] ABSTRACT

A free wing aircraft including a free wing pivotally supported about a spanwise axis for flight in a free wing mode of operation with respect to the fuselage is disclosed. The free wing is capable of being deflected into a nose down configuration sufficient to create an aerodynamic braking effect to decrease air speed after landing upon roll-out. This aerodynamic braking effect can also be sufficient to create negative lift that plants the aircraft firmly down, increasing the coefficient of friction and allowing the aircraft brakes to be more effective relative to a fixed wing aircraft at touchdown.

5 Claims, 1 Drawing Sheet

FREE WING AIRCRAFT HAVING A FREE WING USED AS AN AIR BRAKE TO SHORTEN ROLL-OUT FOLLOWING TOUCHDOWN

TECHNICAL FIELD

The present invention relates generally to aircraft having a free wing for rotation about a spanwise axis to maintain a constant angle of attack with the relative wind and, more particularly, to methods and structures for shortening the roll-out of a free wing aircraft following touchdown.

BACKGROUND ART

A free wing is a wing attached to an aircraft fuselage in a manner such that the wing is freely pivotally about its spanwise axis which is usually located forward of its aerodynamic center. This arrangement enables the wing to have an angle of attack which is determined solely by aerodynamic forces during flight and, therefore, subject only to aerodynamic pitching moments imposed by wing lift and drag. Rotation of the wing, without pilot intervention, induced by positive or negative vertical wind gusts striking the wing during flight, causes the angle of incidence or pitch between the wing and the aircraft fuselage to vary so that the wing presents a constant angle of attack to the relative wind enabling the aircraft to be essentially stall free during flight.

A free wing may be formed with elevons along the trailing edge thereof which are pilot controlled through appropriate linkages to enable the free wing to form the function that an elevator controlled surface performs in a fixed wing aircraft. The free wing is capable of maintaining its independent operation irrespective of upward or downward actuation of the elevons.

Whereas fixed wing aircraft routinely use flaps for take-off and landing, the inherent characteristics of the free wing prevent the use of flaps and therefore deprive the free wing aircraft with the ability to abruptly decelerate in a shortened roll-out after touchdown as otherwise occurs through the use of flaps deployed in a trailing edge up configuration in fixed wing aircraft. Since it is desirable to shorten the roll-out of an aircraft following touchdown, particularly in larger aircraft, a need therefore exists for shortening the roll-out of a free wing aircraft to a full stop.

U.S. Pat. No. 5,280,863 to Hugh Schmittle discloses a free wing aircraft wherein the free wing is lockable so that the aircraft can be converted between a free wing flight mode and a conventional, fixed wing aircraft flight mode. In the fixed wing flight mode, flaps may be provided along the trailing edge of the wing to perform their conventional function. However, there may be certain disadvantages to. providing a free wing aircraft with control mechanisms for selectively locking the free wing into a fixed wing configuration.

It is accordingly an object of the invention to utilize a free wing in a free wing aircraft as an air brake to abruptly decelerate the aircraft during roll-out after landing while the wing retains its free wing characteristics.

DISCLOSURE OF THE INVENTION

A free wing aircraft, in accordance with the present invention, comprises a fuselage and a free wing connected to the fuselage for free pivotal movement within a predetermined angular range about a spanwise axis for flight in a predetermined, generally horizontal direction in a free wing mode of aircraft operation. A propulsion system carried by the fuselage is used to develop thrust for propelling the aircraft both in flight and on the ground during take-off roll. In accordance with the invention, means is provided for deflecting the free wing, trailing edge up, so that the free wing is deflected downwardly beyond said predetermined angular range into a tilted position where it creates an aerodynamic braking effect to decrease air speed after landing.

A method of reducing the air speed of a free wing aircraft on roll-out after landing is also disclosed. The free wing aircraft to which the method of the invention is applicable comprises a fuselage and a free wing connected to the fuselage for free pivotal movement about a spanwise axis for flight in a predetermined, generally horizontal direction in a free wing mode of aircraft operation. A propulsion system carried by the fuselage is used to develop thrust for propelling the aircraft in flight. According to the method, the aircraft is piloted in a descent glide path through touchdown. After touchdown, the free wing is deflected, trailing edge up, so that the free wing body is deflected downwardly into a tilted position sufficient to create an aerodynamic braking effect to decrease air speed during roll-out.

Still other objects and advantages of the present invention will become readily apparent to those skilled in this art from the following detailed description, wherein only the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BEST MODE FOR CARRYING OUT THE INVENTION

Figure 1:
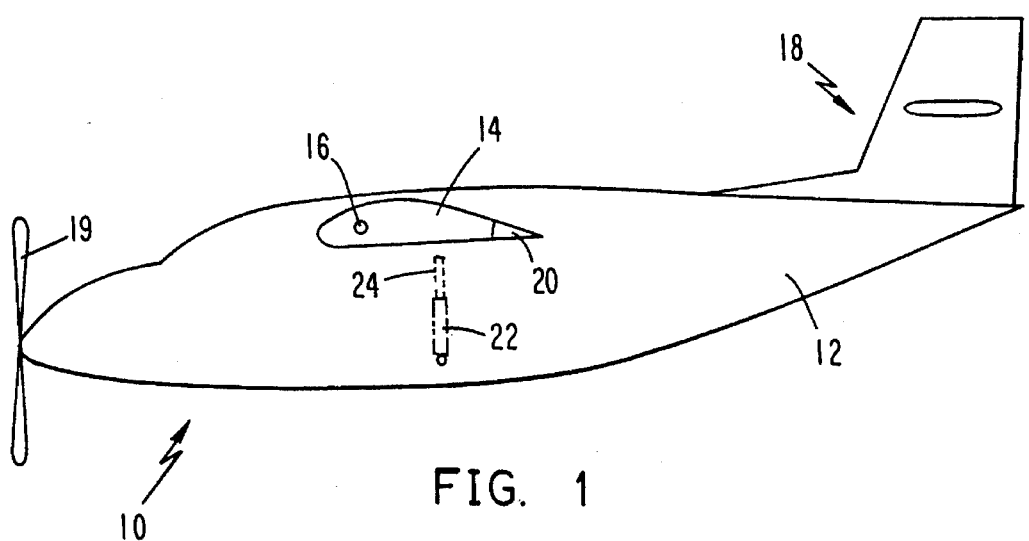
FIG. 1 is a side elevational view of a free wing aircraft constructed in accordance with the principles of the present invention.

FIG. 1 is an illustration of a free wing aircraft 10 comprised of a fuselage 12 and a free wing 14 which is secured to the fuselage along a spanwise axis of rotation 16 for pivoting motion about this axis in a free wing flight mode. This arrangement enables the free wing 14 to have an angle of attack which is determined solely by aerodynamic forces acting on the wing. Rotation of the wing 14, without pilot intervention, induced by changes in the direction of relative wind over the wing surfaces, causes the angle of incidence between the wing and aircraft fuselage 12 to vary so that the wing presents a substantially constant angle of attack to the relative wind which, in horizontal flight, enables the aircraft 10 to be essentially stall free.

Free wing aircraft 10 further includes rudders and elevators (both not shown in detail) in tail section 18 which may be controlled in a conventional manner for yaw and pitch control of the fuselage, respectively. A single propeller 19 or one or more jet engines (not shown) may be utilized as the source of propulsion to supply the necessary thrust for take-off and in-flight operations.

Figure 2:
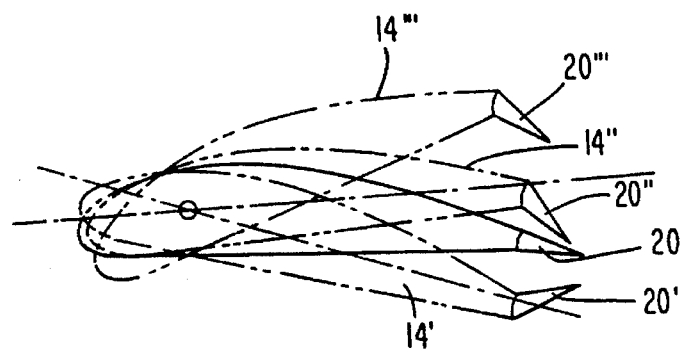
FIG. 2 is an enlarged, partly schematic view, depicting the normal range of movement of the free wing through a predetermined angular range during flight as well as an extreme, downwardly inclined tilted position to create aerodynamic braking after landing.

Free wing 14 preferably further includes a plurality of elevons 20 which are formed on the left and right sections of the trailing edge of the free wing. Elevons 20 perform the same function as an elevator in a fixed wing aircraft. With reference to FIG. 2, upward deflection of the elevon identified by reference numeral 20' forces the trailing end of free wing 14 into a downward position which has the effect of pivoting the leading edge of the free wing into a leading edge up or nose up configuration as depicted with reference numeral 14'. This configuration causes aircraft 10 to climb. Downward deflection of the elevon into the position identified by reference numeral 20" causes the trailing edge of free wing 14 to assume a 'trailing edge up' condition which has the effect of pivoting the free wing about axis 16 into a 'nose down' condition identified by reference numeral 14". In this condition, free wing aircraft 10 will descend.

In accordance with normal operation of free wing aircraft 10, free wing 14 is typically free to pivot within a predetermined angular range of ±8° and this extreme range of positive/negative normal deflection is respectively identified in FIG. 2 by reference numerals 14',14". In some free wing aircraft, this predetermined angular range may be defined by structural limitations. In other free wing aircraft, this predetermined angular range may be defined by flight conditions, e.g., air speed, wind gusts, etc. These angles may vary somewhat from one air foil to another, but the general magnitude should remain about the same. In accordance with a unique feature of the invention, after landing and during roll-out, the pilot will downwardly deflect the elevon 20 into an extreme downward configuration identified with reference numeral 20'". This positive deflection of the elevon 20 by greater than, for example, 8°, will induce a negative deflection of wing 14 about axis 16 into the position identified with reference numeral 14'". In this position (20°–30°), wing 14 advantageously creates an aerodynamic braking effect to decrease air speed during roll-out after landing.

It will now be appreciated by one of ordinary skill in the art that wing 14 may be deflected into its aerodynamic braking position in a variety of different ways. For example, a cylinder 22 pivotally secured to the fuselage (preferably within the interior thereof) may be formed with an extensible and collapsible upwardly projecting piston 24 as best depicted in FIG. 1 in phantom line. During normal in-flight operation, piston 24 may be retracted so that it cannot contact free wing 14. After landing, a pressure switch (e.g., such as one which detects landing forces transmitted through the wheel assembly) may be used to automatically upwardly extend piston 24 so that it positively contacts free wing 14 to bias same into the aerodynamic braking position identified by reference numeral 14'" in FIG. 2. In the alternative, piston 24 may be extending by pilot actuation, preferably only after landing as again detected by a pressure switch.

It is also possible to control rotation of free wing 14 about axis 16 within the aforesaid predetermined angular range by controlling the linkage mechanism (not shown) through which the pilot controls elevons 20 so that the elevons can only be pivoted during flight into the maximum positive and negative deflecting position 20',20" defining the predetermined angular range of movement of free wing 14 during flight. Upon landing, the linkage mechanism may be automatically actuated, or pilot actuated (e.g., after being released or adjusted by a pressure switch as described above) to enable downward deflection of the elevons 20 to the 'air brake' position depicted with reference numeral 20'" in FIG. 2.

Figure 3:
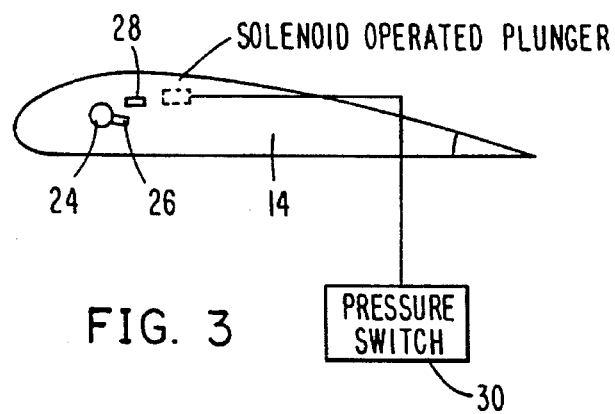
FIG. 3 is a schematic view of a means for actuating the free wing to permit deflection into the aerodynamic braking position.

FIG. 3 is a schematic illustration of another embodiment for enabling use of free wing 14 as an aerodynamic brake. In this embodiment, spanwise axis 16 may be defined by a tube 24 to which the left and right hand free wing sections are attached for co-rotation therewith. The tube 24 is rotatably mounted with wing bearing sections (not shown) located within fuselage 12. Tube 24 may be formed with one or more bosses or ears 26 having an upward deflection limited by the plunger 28 of a fixed solenoid (not shown in detail) mounted within the fuselage when in its extended position depicted by solid line in FIG. 3. Solenoid plunger 28 therefore defines the maximum downward deflection of wing 14 as depicted in its 14" position of FIG. 2 during flight. After landing, a pressure switch 30 may be actuated by landing forces transmitted through the wheels so as to retract solenoid plunger 28 to its dotted line position. In this position, elevons 20 may be operated to pivot wing 14 into its aerodynamic braking position identified with reference numeral 14'" in FIG. 2, with or without assistance from piston 24.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

I claim:

1. A free wing aircraft, comprising:

(a) a fuselage;

(b) a free wing connected to said fuselage for free pivotal movement within a predetermined angular range about a spanwise axis for flight in a predetermined, generally horizontal direction in a free wing mode of aircraft operation;

(c) a propulsion system carried by said fuselage for developing thrust and propelling the aircraft; and (d) means for deflecting said free wing, trailing edge up, while maintaining the free pivotal movement of the free wing so that said free wing is deflected downwardly beyond said predetermined angular range into a tilted position where it creates an aerodynamic braking effect to decrease air speed after landing.

2. The aircraft of claim 1, wherein said deflecting means includes elevons formed along the trailing edge of the free wing.

3. The aircraft of claim 2, wherein said deflecting means further includes means for deflecting said elevons.

4. The aircraft of claim 1, wherein said deflecting means includes a piston actuated by a cylinder to contact the free wing and positively deflect it downwardly beyond said predetermined angular range.

5. A method of decelerating a free wing aircraft during roll-out after landing, said aircraft including a fuselage, a free wing connected to said fuselage for free pivotal movement about a spanwise axis for flight in a predetermined generally horizontal direction in a free wing mode of aircraft operation, and a propulsion system carried by said fuselage for developing thrust and propelling the aircraft in flight, comprising the steps of:
 (a) landing the free wing aircraft; and
 (b) deflecting said free wing into a trailing edge up condition while maintaining the free pivotal movement of the free wing to generate aerodynamic forces acting on the free wing to create an aerodynamic braking effect which decreases air speed during roll-out.

* * * * *